R. M. HUDDLESTON.
CAN END REMOVING MACHINE.
APPLICATION FILED JAN. 22, 1918.
1,319,395.
Patented Oct. 21, 1919.
2 SHEETS—SHEET 2.
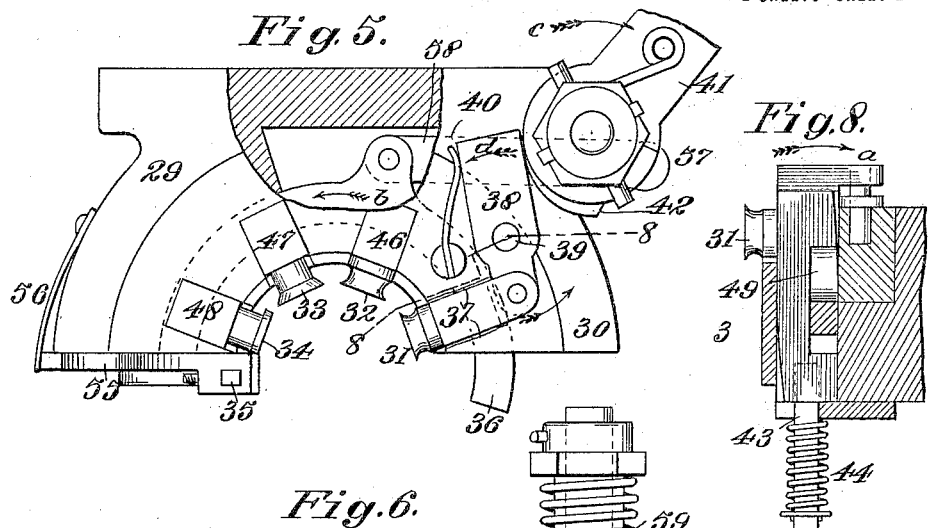
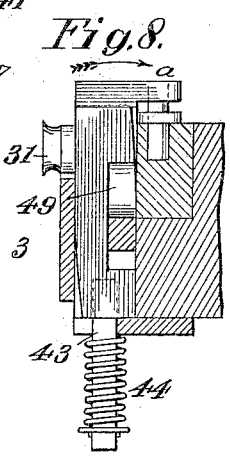
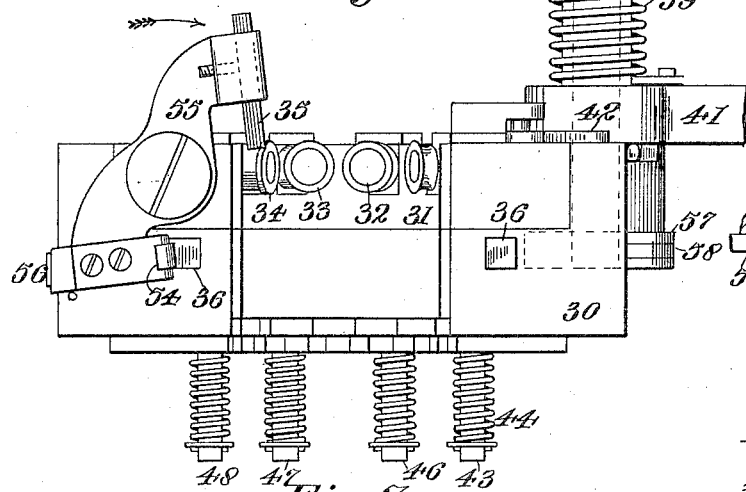
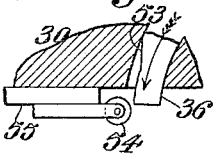
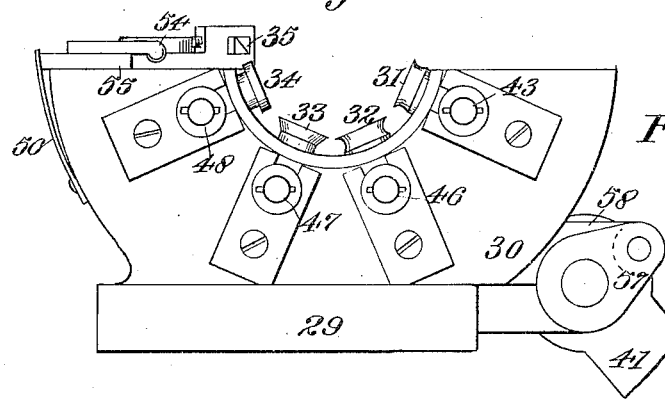
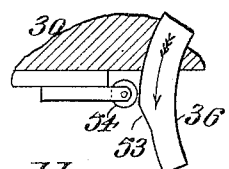
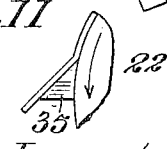
Inventor.
Robert M. Huddleston
By Strong & Townsend
ATTORNEYS

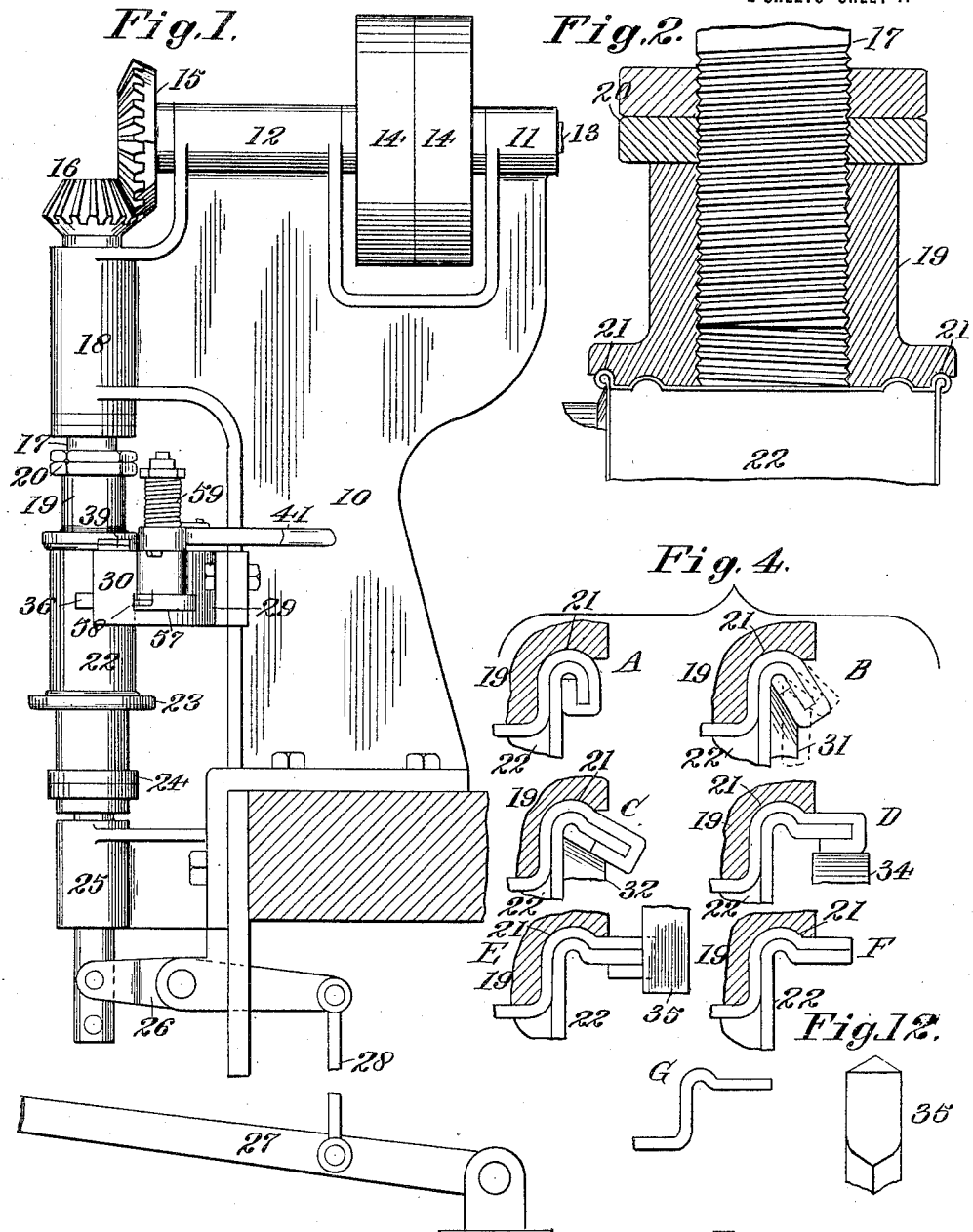

UNITED STATES PATENT OFFICE.

ROBERT M. HUDDLESTON, OF SAN FRANCISCO, CALIFORNIA.

CAN-END-REMOVING MACHINE.

1,319,395.   Specification of Letters Patent.   Patented Oct. 21, 1919.

Application filed January 22, 1918. Serial No. 213,129.

*To all whom it may concern:*

Be it known that I, ROBERT M. HUDDLESTON, a citizen of the United States, residing at the city and county of San Francisco and State of California, have invented new and useful Improvements in Can-End-Removing-Machines, of which the following is a specification.

This invention relates to a machine for removing the seamed tops from can ends.

It is the principal object of this invention to provide a machine which will quickly open the end seam in a can and allow the can top to be removed from the can without mutilation of the can body and by a continuous operation. The structure disclosed in the accompanying drawings and described in the specification embodies an improvement upon my machine for accomplishing the same results and which is covered by an application entitled "Machine for removing can ends," filed December 27th, 1917, and bearing the Serial Number 209,074.

The mechanism by which I accomplish the results above stated comprises a rotary friction chuck which engages and centers the end of the can and revolves the can as it rests upon a rotatable spindle adapted to be vertically reciprocated during operation. Spaced adjacent to the chuck and in position to engage the seam of the can is a seam opening head partially circumscribing the positioned can and provided with successively operating means for opening the seam and severing its marginal edge, whereby the can end will be released and may be removed without mutilation of the can body.

The invention is illustrated, by way of example, in the accompanying drawings, in which—

Figure 1 is a view of the assembled machine, showing a can in position for treatment.

Fig. 2 is an enlarged view, in vertical section, illustrating the special chuck disk and the manner in which it frictionally engages the upper end of the can and further accommodates the can seam.

Fig. 3 is a view in side elevation, illustrating the actuating cam bar of the seam opening head as disassociated therefrom.

Fig. 4 discloses diagrammatically the successive steps in the operation of the seam opening members to unroll the seam and sever its marginal edge to free the can end.

Fig. 5 is a view in plan, illustrating the seam opening head and with parts broken away to more clearly disclose the manual operation of the cam bar.

Fig. 6 is a view in front elevation, disclosing the device shown in Fig. 5.

Fig. 7 is a view in plan, illustrating the head of the machine as viewed from beneath.

Fig. 8 is a view in vertical section, as seen on the line 8—8 of Fig. 5 and illustrating the construction and movement of the initial opening roller support.

Figs. 9 and 10 are fragmentary views in plan, illustrating the final operation of the cam bar in effecting movement of the cutter holder.

Fig. 11 is a fragmentary diagrammatic view, illustrating the action of the cutter upon a can end.

Fig. 12 is a fragmentary perspective view of the cutter.

Referring more particularly to the drawings, 10 indicates the main frame of the machine which is fitted at its upper end with horizontally alined bearings 11 and 12 through which a drive shaft 13 extends. This drive shaft is provided with pulleys 14 receiving their power from a suitable power source and by which a bevel gear 15 is rotated. The bevel gear 15 is here shown as fixed to the forward end of the shaft 13 and in mesh with a bevel pinion 16 fixed to the upper end of a vertically disposed chuck spindle 17. This spindle is mounted within a vertical bearing 18 forming a part of the frame 10.

Detachably mounted upon the lower threaded end of the spindle 17 is a chuck disk 19, particularly shown in Fig. 2. This disk is held in its desired position by jam nuts 20 which engage the collar of the chuck and are positioned upon the spindle 17. The lower end of the chuck member is enlarged and forms a disk, the bottom face of which has been moulded or machined to conform to the contour of the can end, an annular groove 21 being provided to partially accommodate the seam of the can. The outer lip of this groove 21 extends down the side of the seam and insures that the can will be properly centered and rigidly held during the seam opening operation.

The cans which are especially fitted for treatment by this machine are circular and, as indicated in Fig. 1 by the numeral 22, rest upon a supporting disk 23 which is secured to a freely rotating vertical spindle 24 in longitudinal alinement with the spindle 17 and spaced therefrom. This spindle is rotatably held within a bearing 25 fastened to the frame 10 and through which the spindle projects. A lifting arm 26 engages the lower end of the spindle and allows it to be shifted vertically to lift the plate 23 with its can and forcibly hold it in frictional engagement with the chuck disk. This lever is pivotally secured to the machine frame and is connected to a foot treadle 27 by a connecting link 28 conveniently disposed in relation to the foot of the operator.

By the foregoing structure a can may be rotatably supported in its vertical position and may be acted upon by a seam opening head 29, particularly disclosed in Figs. 5, 6 and 7. This head comprises a semicircular block 30 fixed to the front of the machine frame 10 and disposed with its arcuate recess concentric with the longitudinal axis of the spindle 17 and 24. This block is further positioned vertically so that it will partially surround the can 22 when in engagement with the chuck 19 and being rotated thereby.

Movably mounted within the block is a series of seam opening rollers 31, 32 and 33 which have V-shaped circumferential faces each of a different angle and of increased flatness as they are arranged from the first roller 31 to a flattening roller 34. 35 is a cutting tool. These members are independent of each other and are adapted to be successively raised into engagement with the can seam by a cam bar 36 slidably mounted within the block. The roller 31 is mounted upon a floating block 37, particularly shown in Fig. 8; this block having diagonally opposite relieved faces which will allow it to swing in the direction of arrow $a$ and toward and away from the side of the can. This movement is effected by a rocker arm 38 mounted upon a pivot 39 and in pivotal engagement with an extension lug upon the top of the block 37.

A flat spring 40 normally holds the roller in its innermost position, from which position it is moved by rotation of the cam bar shifting lever 41 and a cam 42 movable therewith. By this movement the beveled edge of the roller 31 may be introduced between the seam and the body of the can and will be moved outwardly and forced into engagement therewith, as particularly shown in diagram B of Fig. 4, thus insuring that the body of the can will not be crushed and that the seam will be more readily opened. A stem 43 is fixed to the lower end of the floating block 37 and is provided with a coil spring 44 by which the block, with its roller, will be normally held in its lowermost position to be lifted by the action of an elevating cam 45 of the cam bar 36. This bar is semicircular and extends through recesses in the back of the block 37 and similar blocks 46, 47 and 48 of the rollers 32, 33 and 34, respectively; each of these blocks being provided with cam rollers 49 which may be brought into contact with their separate cam faces 45, 50, 51 and 52 and by which the blocks and rollers will be successively elevated.

A side cam 53 is formed on the outer face of the cam bar 36 and near the upper cam face 52. This cam is adapted to engage a roller 54 mounted upon an oscillating tool holder 55 secured to the end of the main block 30. This holder is adapted to receive the tool steel cutters 35 and to be swung into engagement with the outer portion of the can seam, as particularly shown in diagram E of Fig. 4. A spring 56 normally holds the tool holder 55 in its upper and outermost position.

The seam engaging rollers and the cutter are all actuated by the cam 36, which in turn is moved in the direction of arrow $b$ in Fig. 5 by rotation of the shifting lever 41 pivoted upon the main block of the head. This lever actuates a crank arm 57, pivotally connected with the cam 36, by a connecting link 58, and when moved in the direction of arrow $c$ (see Fig. 5) will effect movement of the cam bar. A coil spring 59 is provided to restore the shifting lever and the bar to their normal positions.

In operation, the disk 23 is normally lowered and thereafter the can 22 is positioned upon it and in approximate register with the chuck 19, and pressure upon the foot pedal 27 will lift the disk 23 and cause the can to be positively held between this disk and the chuck 19, at which time the can will assume the position indicated in Fig. 2. It is to be noted that frictional engagement of the chuck face with the can end is sufficient to effect its rotation. As the chuck and can are rotated the shifting lever 41 is drawn toward the operator in the direction of arrow $c$ and will simultaneously force the cam bar 36 in the direction of the arrow $b$ and the rocker arm 38 in the direction of the arrow $d$. The continued movement of the shifting lever 41 and the cam bar will first bring the cam face 45 into engagement with the roller 49 upon the block 37 and therebeneath, thus raising the block and forcing the V-shaped edge of the roller 31 between the body of the can and its seam at the same time the cam 42 is acting to draw the roller 31 outwardly to spread the seam, as shown in Fig. 4.

After this operation has been completed the cam face 50 will engage the roller of block 46 and lift the spreading roller 32 which is formed with its V-shaped end having a more obtuse angle than the preceding roller. This operation is followed by movement of the roller 33 by the cam 51, after which the flattening roller 34 is raised by the cam 52, as shown in diagram D of Fig. 4. In this operation the outer lip of the chuck will securely hold the main portion of the seam and will allow the flattening roller, which is entirely cylindrical, to force the main portion of the seam to a horizontal position. When this has been done the side cam 53 swings the cutter 35 into engagement with the periphery of the flattened seam and causes it to be cut, as shown in Fig. 11. This tool is adjusted so that the main lip of the can will not be mutilated and so that only the folded portion around the end of this lip will be severed. When this operation has been effected the lid and can will bear the relationship shown in diagram F of Fig. 4, and thereafter the can may be removed from between the chuck 19 and the disk 23 and the lid taken off. The formation of the seam portion of the lid will then appear, as indicated in diagram G of Fig. 4.

It will thus be seen that by the operation of this machine a can may be easily placed into position and may be quickly relieved of its lid without danger of mutilation of the can body either during the seam opening operation or while removing the lid. It will further be noted that the mechanism used in the performance of the can end removal is simple, both as to its construction and as to its operation, and does not embody parts which are liable to become broken or otherwise inoperative.

Having thus described my invention, what I claim and desire to secure by Letters Patent is—

1. In a machine for removing lock seam ends from can bodies, a series of means to progressively press the seam outwardly, oscillatory cutting means, and means common to all of said means to actuate same.

2. In a machine for removing lock seam ends from can bodies, a series of means for progressively pressing the seam outwardly, oscillatory cutting means, and a cam common to all of said means to actuate same.

3. In a machine for removing lock seam ends from can bodies, a series of means for progressively pressing the seam outwardly, means to mount one of said means so as to allow same to oscillate, a movable cutting means, means common to the pressing means to actuate same and having a part to move the cutting means to cutting position subsequent to the operation of the pressing means and in a continuous movement of said actuating means.

4. In a machine for removing lock seam ends from can bodies, means to receive and retain the can, an initial oscillatory straightening roller having a beveled flange of sharp inclination, intermediate straightening rollers having beveled flanges of less inclination, and a straight-faced roller arranged to successively enter the seam and press the same open and the can flange upwardly and outwardly at right angles to the axis of the can body upon relative rotation between the cam and rollers.

5. In a machine for removing lock seam ends from can bodies, means to receive and grip the can, means including an oscillatory device for forcing the seam open and away from the can body leaving a flange on the body and a channel rim on the can end encompassing the flange, and means for severing the channel portion of the can end along the edge of the flange to release it therefrom.

6. In a machine for removing lock seam ends from can bodies, rotatable means to receive and frictionally grip the can, means for pressing the seam outwardly from the can body leaving a flange on the body and a channel rim on the can end encompassing the flange, and oscillatory cutting means to engage the outstanding seam and sever the channel portion on a line with the edge of the flange.

7. In a machine for removing lock seam ends from can bodies, rotatable means to receive and frictionally grip the can, means for pressing the seam outwardly from the can body leaving a flange on the body and a channel rim on the can end encompassing the flange, and an oscillatory cutting tool projectible into engagement with the outstanding seam portion to sever the channel rim on a line with the circumferential edge of the flange at the completion of the seam pressing operation.

8. In a machine for removing lock seam ends from can bodies, means to receive and retain a can, means including an oscillatory device to press the seam outwardly from the can body leaving a right angular flange on the body and a channel rim on the can end encompassing said flange, and means to sever the channel portion of the can end circumscribing the marginal edge of the can flange.

9. In a machine for removing lock seam ends from can bodies, means to receive and rotate a can, means successively engageable with the underside of the seam to progressively press the same outwardly and open leaving a right angular flange on the body and a channel rim on the can end encompassing said flange, and oscillatory means operating in sequence thereto to sever said channel portion as the can is rotated.

10. In a machine for removing lock seam ends from can bodies, means for frictionally engaging and rotating a can, and means adapted to wedge into the can seam and to simultaneously move outwardly therefrom to open the seam and bend it outwardly during the rotation of the can.

11. In a machine for removing lock seam ends from can bodies, means for frictionally engaging and rotating a can, means adapted to wedge into the can seam and to simultaneously move outwardly therefrom to open the seam and bend it outwardly during the rotation of the can, and means operating in sequence thereto for engaging and severing the remaining seam without mutilation of the can flange.

12. In a machine for removing lock seam ends from can bodies, means for frictionally engaging and rotating a can, a series of rollers one of which is oscillatory adapted to successively operate to progressively open the can seam to a position at right angles to the can body, other means for then severing said seam without mutilation of the can flange, and control means for causing said seam opening and severing means to operate in sequence in performing their functions.

In testimony whereof I have hereunto set my hand in the presence of two subscribing witnesses.

ROBERT M. HUDDLESTON.

Witnesses:
W. W. HEALEY,
M. E. EWING.

Copies of this patent may be obtained for five cents each, by addressing the "Commissioner of Patents, Washington, D. C."